United States Patent

Morimoto et al.

[11] Patent Number: 6,062,826
[45] Date of Patent: May 16, 2000

[54] PULSATING VIBRATION AIR GENERATION MEANS

[75] Inventors: Kiyoshi Morimoto; Yasushi Watanabe; Yoshika Sanada, all of Shizuoka; Sanji Tokuno, Tokyo; Kazue Murata, Nara, all of Japan

[73] Assignees: Kyowa Hakko Kogyo Co., Ltd., Tokyo; Kabushikikaisha Matsui Seisakusho, Osaka, both of Japan

[21] Appl. No.: 08/713,128

[22] Filed: Sep. 16, 1996

[30]     Foreign Application Priority Data

Sep. 18, 1995   [JP]   Japan .................................... 7-238224

[51] Int. Cl.⁷ ...................................................... F04B 49/00
[52] U.S. Cl. ........................... 417/297; 417/502; 417/510; 137/624.13; 74/55
[58] Field of Search ..................... 417/297, 502, 417/510; 137/624.13, 624.15, 614.17; 74/55, 569

[56]             References Cited

U.S. PATENT DOCUMENTS

| | | |
|---|---|---|
| 1,601,345 | 9/1926  | Burtnett ................................... 417/510 |
| 4,650,159 | 3/1987  | Shimamura ................................. 74/55 |
| 5,076,769 | 12/1991 | Shao ............................................ 74/55 |
| 5,203,857 | 4/1993  | Terwilliger et al. ..................... 417/510 |
| 5,520,144 | 5/1996  | Philo et al. ............................... 74/569 |

*Primary Examiner*—Charles G. Freay
*Assistant Examiner*—Cheryl J. Tyler
*Attorney, Agent, or Firm*—Jones, Tullar & Cooper, P.C.

[57]             ABSTRACT

A pulsating vibration air generator in which wave height, frequency and wave shape of the pulsating vibration air can be optionally modified and such pulsating vibration air can be periodically and continuously emitted. The pulsating vibration air generator has a valve chamber with an inlet port and an outlet port where a valve plug and a valve seat with a control opening are provided and a cam mechanism which moves the valve plug to open or close the opening of the valve seat, whereby positive or negative pulsating vibration air is emitted from the outlet port while pressurized air is supplied into the inlet port or air is sucked from the inlet port.

11 Claims, 13 Drawing Sheets

PULSATING VIBRATION AIR GENERATION MEANS

BACKGROUND OF THE INVENTION

I. Field of the Invention

The present invention relates to a pulsating vibration air generation means wherein accurate pulsating vibration air can be periodically and continuously generated by opening and closing a control opening of a valve by means of a cam mechanism while pressurized air or suction air is supplied from an inlet port to an outlet port.

II. Prior Art

A basic principle of such a pulsating vibration air generation means has been already proposed by the present inventor in Japanese Patent Application No.5-104028 (U.S. Pat. No. 5,458,458 issued on Oct. 17, 1995 and EPC Publication No. 0625659 published on Nov. 23, 1994).

FIGS. 17 and 18 show the pulsating vibration air generation means (a) proposed in the above-mentioned application. The construction and the operation are as follows. A pulsating air transmitting port (c) and two connecting ports for a blower (d, e) are provided around an external wall of a cylindrical casing (b). A valve plate (f) is rotated in the casing (b) accompanied with rotation of an axis (i) connected with a driving motor (not shown) with the inside of the casing (b) divided into two spaces (g, h) by the valve plate (f). When the valve plate (f) is continuously rotated in one direction while communicating the connecting ports (d, e) with a supply port (k) and a suction port (m) of a blower (j) respectively, positive pressure and negative pressure are generated alternately so that pulsating vibration air is emitted from the transmitting port (c).

However, there has been a room for improvement because highly pressurized air leaks between the valve plate (f) and the internal surface of the casing (b) when highly pressurized air is supplied in the above-mentioned pulsating air generation means (a) by means of an air source such as a compressor. Therefore, pulsating vibration air with high pressure and clear wave shape can't be generated.

Further, wave shape of pulsating air obtained by the pulsating air generation means (a) has been limited to the one which had previously set at the stage of designing and pulsating vibration air with an optional wave shape which has different rising or falling characteristics can't be obtained.

SUMMARY OF THE INVENTION

The present invention has been developed in view of the above-mentioned problems. Accordingly, the primary object of the present invention is to propose a pulsating vibration air generation means wherein wave height, frequency, or wave shape of pulsating vibration air can be optionally set and modified and such pulsating vibration air is periodically emitted in accurate and safe manner.

The second object of the present invention is to provide a pulsating air generation means in which accurate and clear pulsating vibration air is periodically emitted even if highy pressurized air is supplied.

In the present invention, a valve plug operated by a cam mechanism is provided in a valve chamber including a valve seat with a control opening between an inlet port and an outlet port. It is constructed such that positive pulsating vibration air is generated from the outlet port by controlling the valve plug to open or close the control opening of the valve seat while driving the cam mechanism and supplying pressurized air into the inlet port.

In another pulsating vibration air generation means of the present invention, a valve plug operated by a cam mechanism is also provided in a valve chamber including a valve seat with a control opening between an inlet port and an outlet port. It is constructed such that negative pulsating vibration air is generated from the outlet port by controlling the valve plug to open or close the control opening of the valve seat while driving the cam mechanism and sucking air from the inlet port.

Further in the present invention, a valve seat with a control opening formed like a mortar with a narrow opening end and the valve plug having a head portion formed like a bowl which is designed to be airtightly inserted into the control opening of the valve seat when valve close operation is executed are provided.

In still another present invention, a valve seat formed like a flat ring with a center opening as a control opening and a valve plug constructed like a flat plate which is designed to airtightly close the center opening of the valve seat when valve close operation is executed are provided. In this case, even air supplied from a blower with large flow can be interrupted and controlled.

In the above-mentioned means, it may be constructed such that a roller is provided with the valve plug at the lower end of the valve and a cam has a ring-like guide groove into which the roller is inserted whereby the valve plug is moved to open or close the control opening of the valve seat when the cam is rotated by means of the driving means.

Further in the present invention, a cam mechanism with a plate-type cam and a valve plug attached with a roller at the lower end thereof are provided.

In this embodiment, it is constructed such that rotating movement of a cam mechanism is smoothly converted into a linear motion of the valve, either up and down or side to side. In one embodiment, a vibration absorbing means is provided so as to absorb vibration generated when rotation movement of the cam mechanism is converted into an up-and-down movement of the valve. In another embodiment, it is constructed such that a spring is provided between the lower end of a valve and a body when the valve is placed on a plate-type cam surface. In this construction open and close operation of the valve can be smoothly achieved because the valve is pressed on the cam surface so as not to be loosen when the valve moves up and down accompanied with rotation of the cam.

In still another embodiment of the present invention, a flow rate control port communicating with a valve chamber and connected to an output control valve is provided so as to control the flow of pulsating vibration air from the outlet port.

Now operation of pulsating vibration air generation means according to the present invention is described hereinafter.

In one embodiment of the present invention, a control opening of a valve seat provided in a valve chamber is opened or closed by a valve plug by driving a cam mechanism while pressurized air is supplied into an inlet port connected with the valve chamber so that positive pulsating vibration air is periodically emitted from an outlet port.

In one embodiment of the present invention, a control opening of a valve seat provided in a valve chamber is opened or closed by a valve plug by driving a cam mechanism while air is sucked from an inlet port connected with the valve chamber so that negative pulsating vibration air is periodically emitted from an outlet port.

In such a mechanism, open and close operation of the valve is accurately specified by rotating movement of the cam mechanism. Therefore, optional pulsating vibration air with different wave height, frequency, or wave shape (rising and falling characteristics) can be continuously and regularly generated.

A motor with regular and steady rotation speed can be utilized as a driving source of the cam mechanism. So, pulsating vibration air with high frequency can be emitted regularly and periodically because the control opening of the valve seat can be opened or closed in a short time by driving the motor compared with the one wherein an electrical signal such as a solenoid is turned on or off.

According to one embodiment of the present invention, a valve seat with a control opening formed like a mortar with a narrow opening end is provided and a head portion like a bowl with spherical surface is airtightly inserted into the opening when valve close operation is executed so that air isn't leaked from the valve. Therefore, opening and closing of the valve can be operated clearly and a wave with sharp rising and falling edge can be obtained.

The valve is constructed such that the head has the spherical surface which is designed so as to be airtightly engaged with the control opening of the valve seat and the valve is closed when the head is inserted into the opening. Uniform pressure is applied on the valve seat so that sealing effect of the valve becomes high and its wear resistance can be improved.

In one embodiment of the present invention, a valve seat formed like a flat ring with a center opening is closed by a flat valve plate so that air of large flow can be interrupted. Therefore, it is preferable for generating pulsating vibration air by using an air supply source such as a blower which supplies a large amount of air.

According to an embodiment of the present invention, a cam mechanism is comprised of a rotating cam so that a rotation driving source such as a motor can be used. As a result, open and close operation of a control opening of the valve seat can be executed in regular cycle accompanied with rotation of the motor.

Compared with a valve mechanism wherein an electrical signal such as a solenoid is turned on and off, the valve operated by the driving source of the present invention can be switched swiftly so that pulsating vibration air with high frequency can be stably obtained.

In one embodiment of the present invention, it may be constructed such that a roller attached to the lower end of a valve is guided and moved by a ring-like groove of the cam when the cam is rotated by driving a cam mechanism. Accordingly power transmission into the valve can be certainly achieved. And pulsating vibration air with optionally changed wave height, frequency or wave shape (rising and falling edge) can be easily obtained by varying the shape of the groove of the cam.

In one embodiment of the present invention, a valve is operated when rotating movement of an eccentric cam is converted into up and down movement of the valve via a bearing. In another embodiment of the present invention, a ring to which the eccentric cam is inserted via bearings is also moved up and down accompanied with rotation of the eccentric cam. In this case, the valve seat can be smoothly opened or closed because the bearings are interposed between the eccentric cam and the ring.

According to one embodiment of the present invention, a cam mechanism is comprised of a plate type cam and operation of a valve is made possible by means of a back and forth driving means which reciprocally moves the plate type cam. In this embodiment, a rotation driving source isn't provided under the valve so that it is preferable when there is no upwards and downwards space in an instrument.

According to one embodiment of the present invention, a vibration absorbing means such as a rubber vibration isolator is provided so as to absorb vibration generated when the valve is moved by means of the cam mechanism. Therefore, up and down movement of the valve may be smoothly executed so as to open or close the valve.

According to one embodiment of the present invention, a lower part of a valve is always pressed on the plate-type cam surface of the cam mechanism by means of elasticity of a spring. So the lower part of the valve is prevented from loosing from the cam surface and operation of the valve may be executed certainly.

According to one embodiment of the present invention, a flow rate control port communicating with valve chamber is further provided so as to stop the emission of pulsating vibration air without stopping a driving source. Further, output of pulsating vibration air can be changed by adjusting opening degree of the output control valve.

BRIEF DESCRIPTION OF THE DRAWINGS

FIG. 7(a) corresponds to FIG. 4(a) and FIG. 7(b) corresponds to FIG. 4(b).

DETAILED DESCRIPTION OF THE PREFERRED EMBODIMENT

Now embodiments of the present invention will be described with reference to the accompanying drawings.

Figure 1:
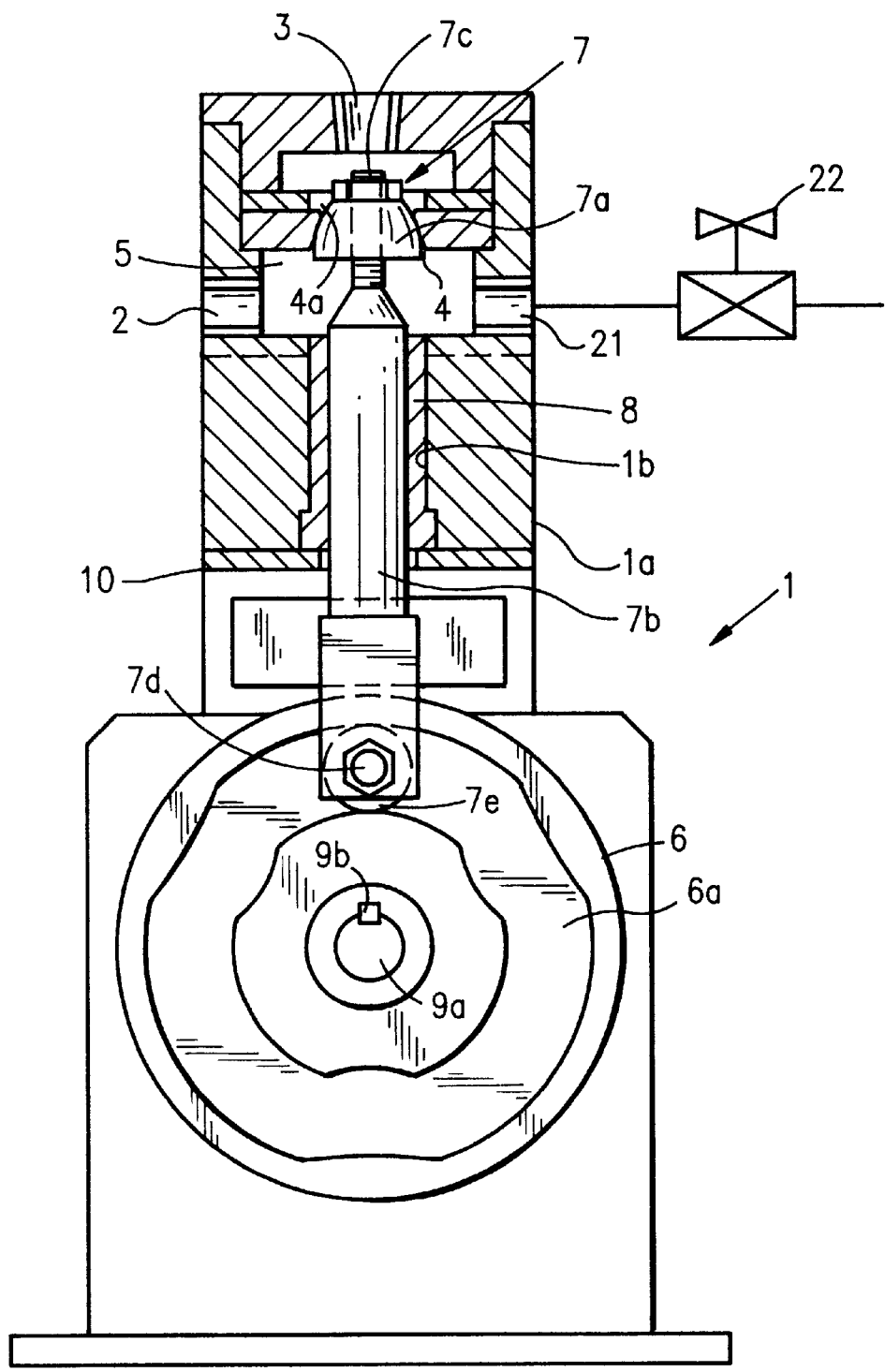
FIG. 1 is a front view, partly in cross section, of a pulsating vibration air generation means according to the present invention.
Figure 2:
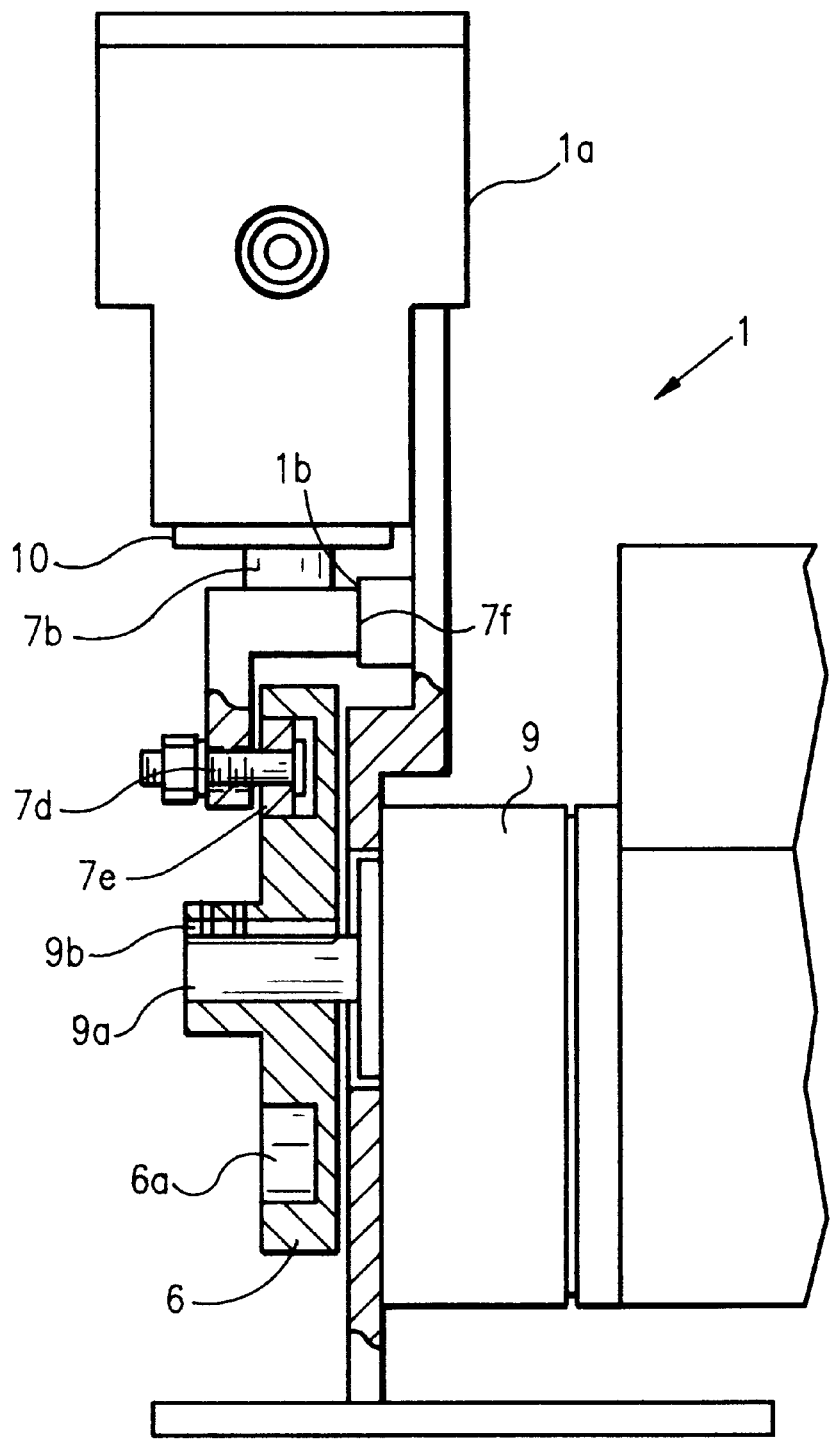
FIG. 2 is a side view, partly in cross section, of the embodiment of FIG. 1.
Figure 3:
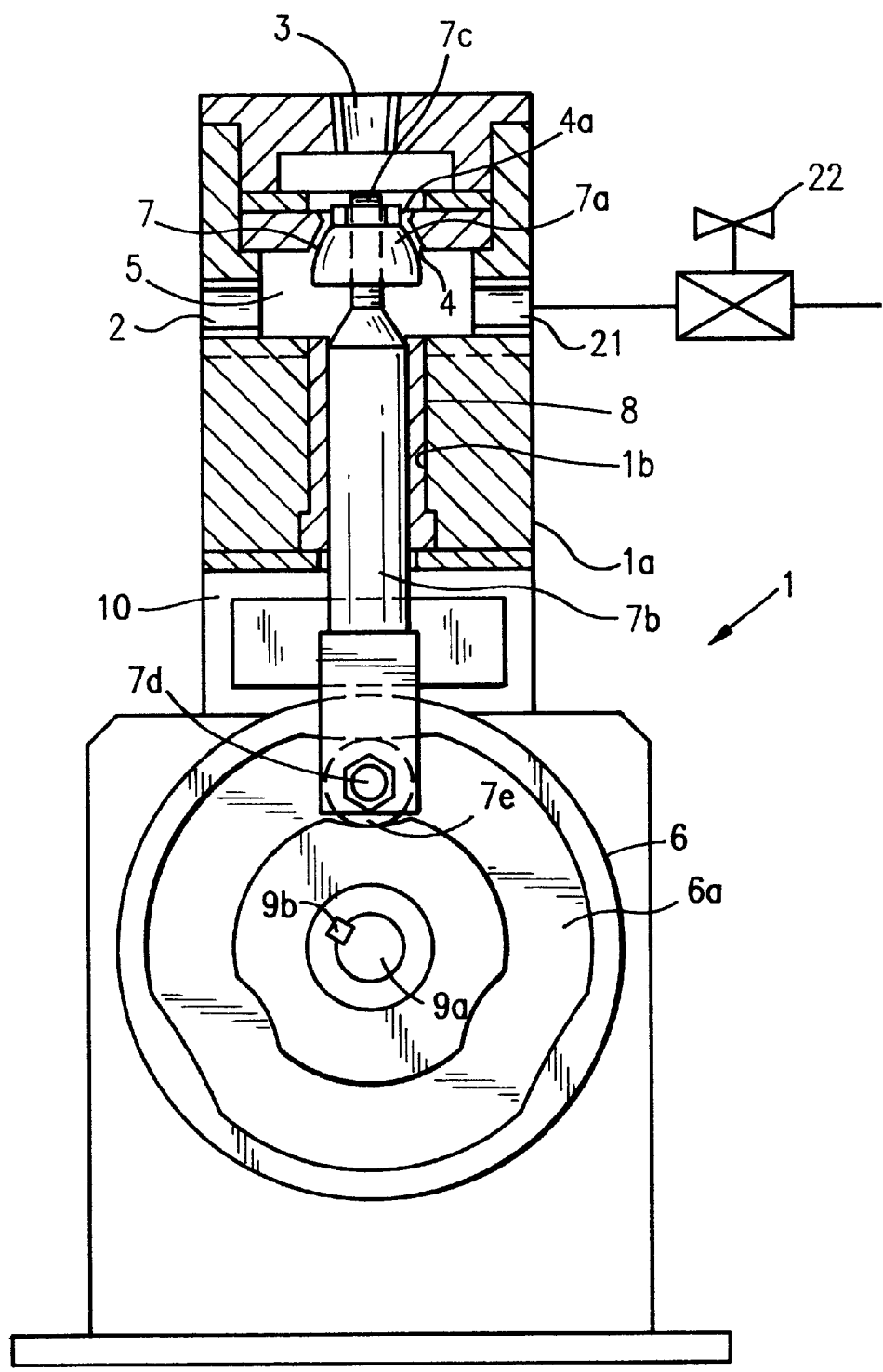
FIG. 3 is a front view, partly in cross section, of the embodiment of FIG. 1 when a valve is opened.

FIG. 1 is a front view, partly in cross section, of a pulsating vibration air generation means which generates positive pulsating vibration air. FIG. 2 is its side view and FIG. 3 shows a condition where a rotating cam is rotated and a valve head is departed from a valve seat so that a valve is opened.

According to the figures, a pulsating vibration air generation means 1 is provided with a valve chamber 5 in which a valve seat 4 is positioned downward between an inlet port 2 and an outlet port 3 and is also provided with a valve 7 which is opened and closed by rotating a cam 6.

A flow rate control port 21 is formed in opposite side of the inlet port 2 of the valve chamber 5 and is connected with an output control valve 22.

A pressurized air supply source such as a compressor (not shown) is connected with the inlet port 2.

The outlet port 3 is positioned at the upper end of a body 1a of the pulsating vibration air generation means 1 so as to pierce the body 1a and is connected with an instrument (not shown) to which pulsating vibration air generated by the pulsating vibration air generation means 1 is supplied.

The valve seat 4 is formed like a mortar with a narrow opening end as a control opening 4a facing to the outlet port 3. A head portion 7a of the valve 7 is formed like a bowl which is designed to be airtightly inserted into the control opening 4a of the valve seat 4.

The head 7a of the valve 7 is fixed to a screw part 7c formed at the upper end of a rod 7b which is pierced so as to be movable up and down in a cylindrical axis receiver 8 inserted in a central through hole 1b formed in the body 1a. An axis 7d attached with a roller 7e rotatably is projected horizontally out of the lower end of the rod 7b.

As shown in FIG. 2, the lower part of the rod 7b is formed like an inverted letter "L" when seen from side and its back end 7f of the rod 7b, which is projected backward, is attached to a projected part 1c of the body 1a so as to be movable up and down.

It is preferable that the valve seat 4 is made of silicon which has high sealing effect and is easy to be manufactured. And it is also preferable that the head 7a and the rod 7b of the valve 7 are made of stainless steel which has high durability.

A ring-like cam groove 6a is provided for the cam mechanism 6 so as to insert the roller 7e of the valve 7. When the cam 6 is rotated, the rod 7b of the valve 7 moves up and down. The cam 6 is fixed with the upper end of a rotating axle 9a of a driving motor 9 by means of a pin 9b so that the cam 6 is driven to be rotated by the motor 9. The numeral 10 in FIG. 1 is a support plate to keep the axis receiver 8 inserted.

Next, operation of the pulsating vibration air generation means 1 will be explained.

When the driving motor 9 is driven, the cam 6 is rotated around the axle 9a and the roller 7e which is inserted in the groove 6a of the cam 6 moves the valve 7 vertically. When the head 7a of the valve 7 is joined with the valve seat 4, the control opening 4a of the valve seat 4 is closed as shown in FIG. 1. When the head 7a is departed from the valve seat 4, the control opening 4a of the valve seat 4 is opened and pressurized air flows into the outlet port 3 from the inlet port 2 through the space between the valve seat 4 and the head 7a. This operation is repeated so that positive pulsating vibration air is generated from the outlet port 3.

Figure 4A:
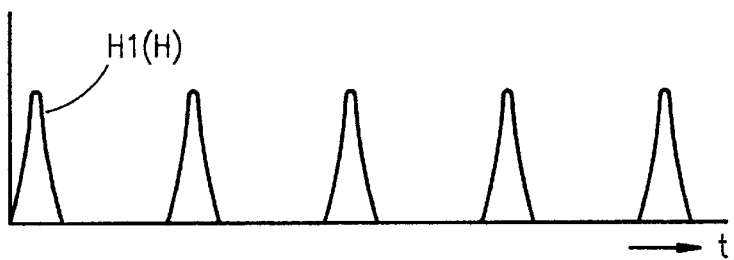
FIGS. 4(a) and 4(b) shows pulsating vibration air which can be generated by the pulsating vibration air generation means of the present invention. Pulsating air of FIG. 4(b) has higher frequency than pulsating air of FIG. 4(a).
Figure 4B:
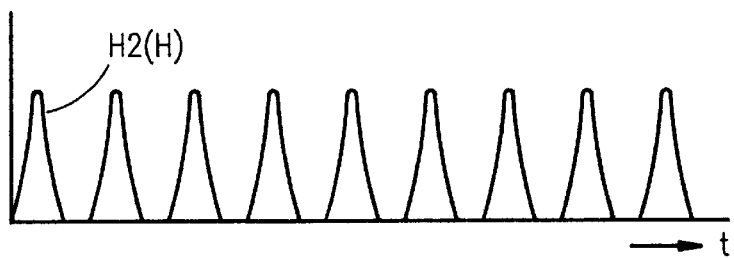
Figure 5:
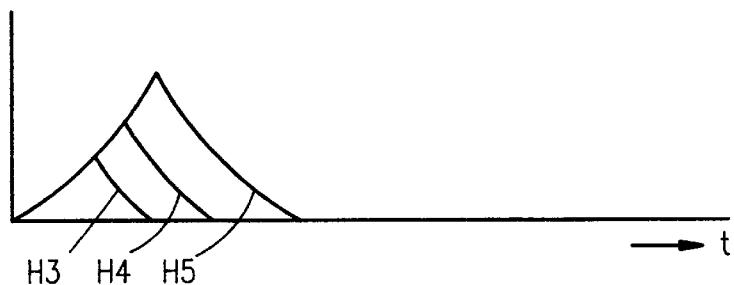
FIG. 5 shows pulsating vibration air (representing change of wave height) which is generated by the pulsating vibration air generation means of the present invention.
Figure 6:
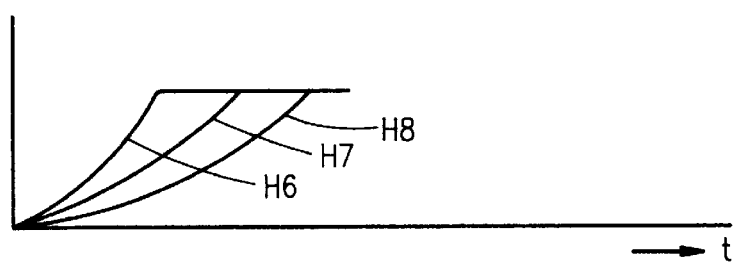
FIG. 6 shows pulsating vibration air (representing change of rising) which is generated by the pulsating vibration air generation means of the present invention.

FIGS. 4(*a*), 4(*b*), FIG. 5 and FIG. 6 show wave shapes of pulsating vibration air obtained by the pulsating vibration air generation means 1. Optional wave shape can be obtained by varying the shape of the groove 6a of the cam 6.

FIGS. 4(*a*) and 4(*b*) show change of frequency of pulsating vibration air.

In this invention, such control is made possible by varying a pitch of the cam while keeping a fixed speed from full opening of the valve to full closing of the valve. In this case the pitch of the cam and the frequency are inversely proportioned.

When the pitch lp of concavity b of the cam groove 6a is made half of that of a wave shape H1 of the pulsating vibration air shown in FIG. 4(*a*), a wave shape H2 in FIG. 4(*b*) can be obtained.

Figure 7A:
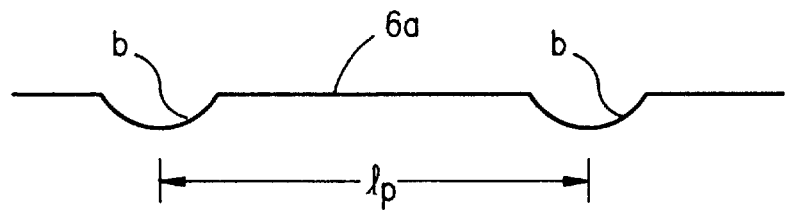
FIGS. 7(a) and 7(b) linearly shows a ring-like guide groove of a rotary cam of a cam mechanism of the pulsating vibration air generation means which generates wave shape of FIGS. 4(a) and 4(b).
Figure 7B:
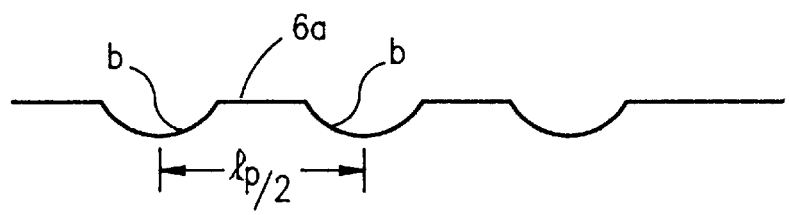

If the depth of the concavity b is the same as shown in FIGS. 7(*a*) and 7(*b*), the pitch lp from one concavity b to another concavity b of the cam groove 6a in FIG. 7(*b*) is half of that of FIG. 7(*a*). Therefore, the wave shapes H1 and H2 which have the same wave height and different pitch can be obtained.

Figure 8:
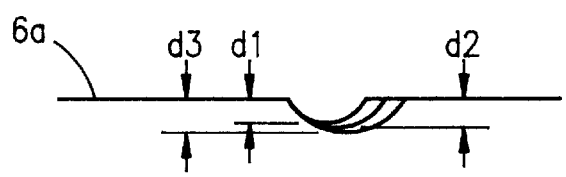
FIG. 8 linearly shows a ring-like guide groove of a rotary cam of a cam mechanism of the pulsating vibration air generation means which generates wave shape of FIG. 5.
Figure 9:
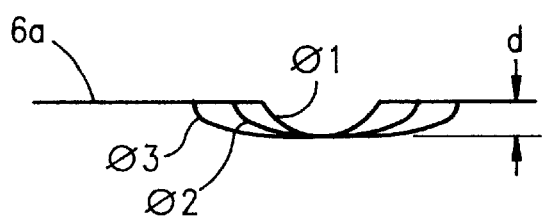
FIG. 9 linearly shows a ring-like guide groove of a rotary cam of a cam mechanism of the pulsating vibration air generation means which generates wave shape of FIG. 6.

When the inclination of the concavity b of the groove 6a is the same and its depth is different such as d1, d2, and d3 as shown in FIG. 8, the wave shape of H3, H4, and H5 which have different falling edges like in FIG. 5 can be obtained. Further, the depth of the concavity b is the same and an inclined curve is different such as φ1-φ3, the wave shapes of H6, H7, and H8 which have different rising shown in FIG. 6 can be obtained. In FIGS. 7–9 the cam groove 6a is shown linearly for the convenience of explanation.

As mentioned above, pulsating vibration air with optional wave height, wave shape (rising and falling edge), and frequency can be obtained by the pulsating vibration air generation means 1 of the present invention. Especially, pulsating vibration air with sharp wave shape is also obtained.

Further, supply of pressurized air from the inlet port 2 to the outlet port 3 including stop of supply can be controlled in the present invention by operating the output control valve 22 connected to the flow rate control port 22. For example, emission of pulsating vibration air can be stopped without turning off the driving source.

Figure 10:
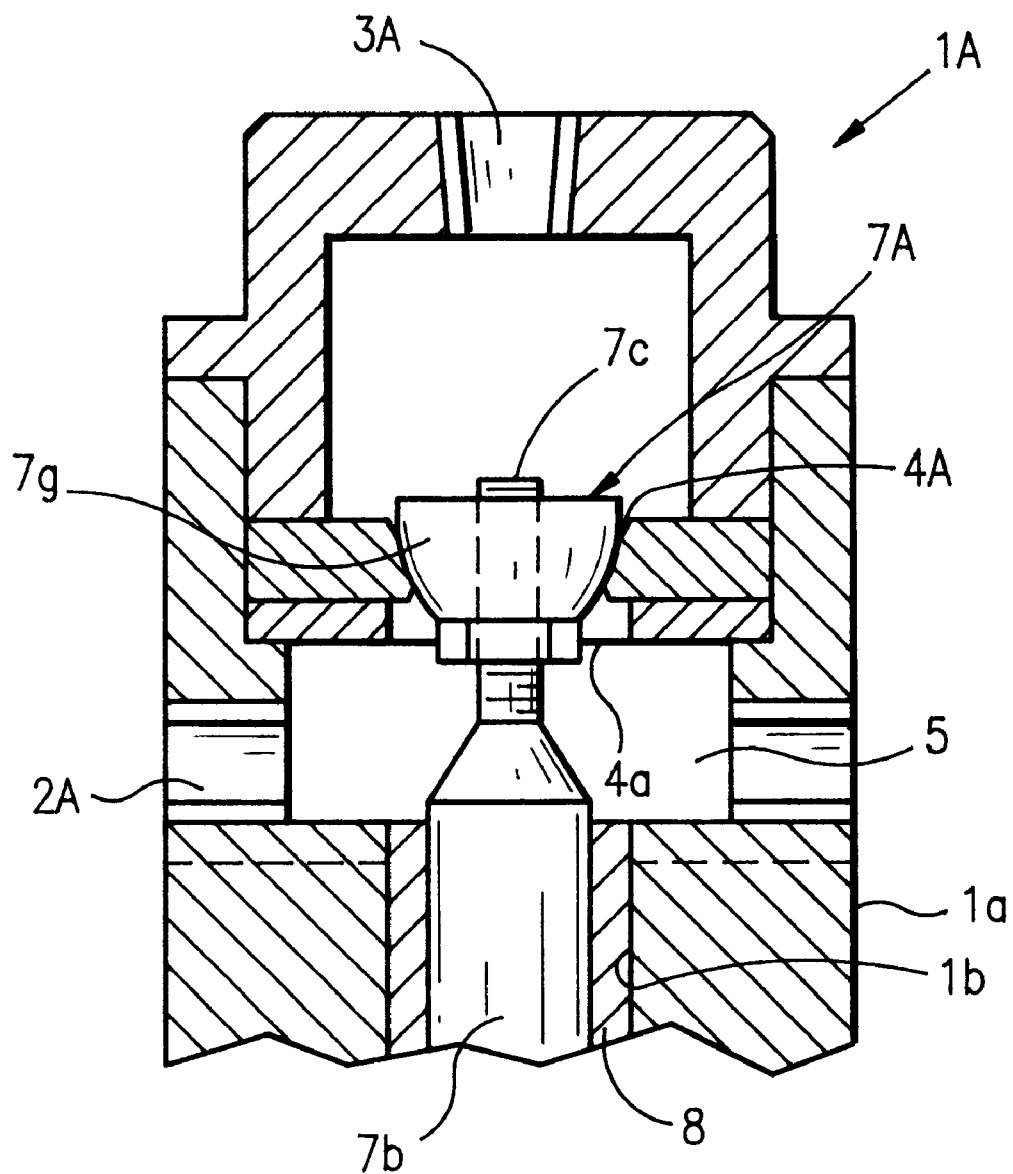
FIG. 10 is a vertical sectional view showing another embodiment of the pulsating vibration air generation means.

FIG. 10 shows a pulsating vibration air generation means 1A which generates negative pulsating vibration air. A valve seat 4A with a control opening 4a is formed in the valve chamber 5 with its narrow opening end facing to an inlet port 2A. And a valve head 7g of a valve 7A is formed like a spherical bowl and is attached above the valve seat 4A. The upper end of a rod 7b of the valve 7A is pierced through the valve seat 4A.

According to this type of pulsating vibration air generation means 1A, the valve 7A is operated while air suction is applied on the inlet port 2A and air is sucked from the outlet port 3A toward the inlet port 2A. Whereby, negative pulsating vibration air can be emitted from the outlet port 3A.

Other construction of the above-mentioned embodiment is the same as that of the first embodiment, so the same numerals are used and its explanation is omitted here.

Figure 11:
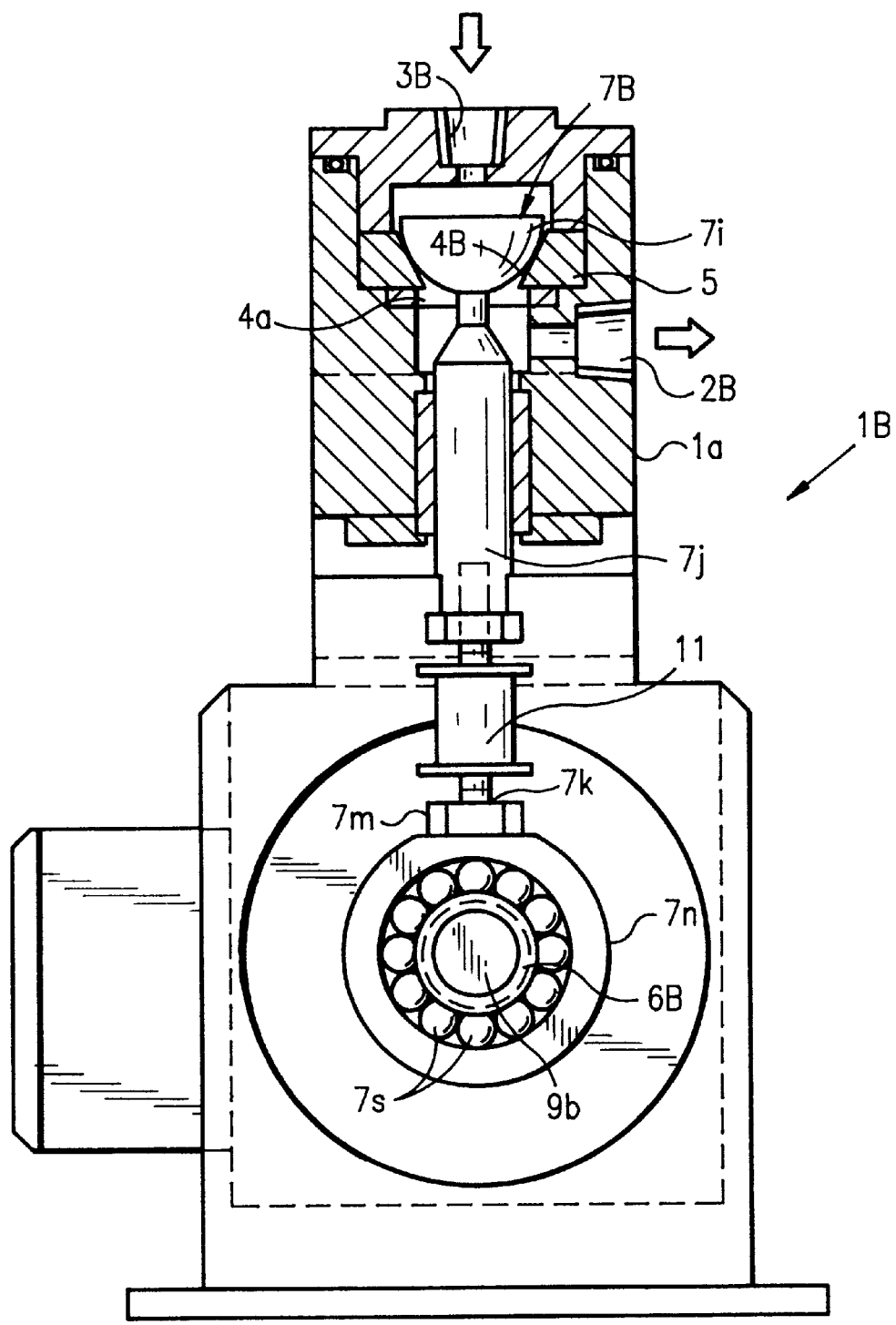
FIG. 11 is a front view, partly in cross section, showing still another embodiment of the pulsating vibration air generation means.
Figure 12:
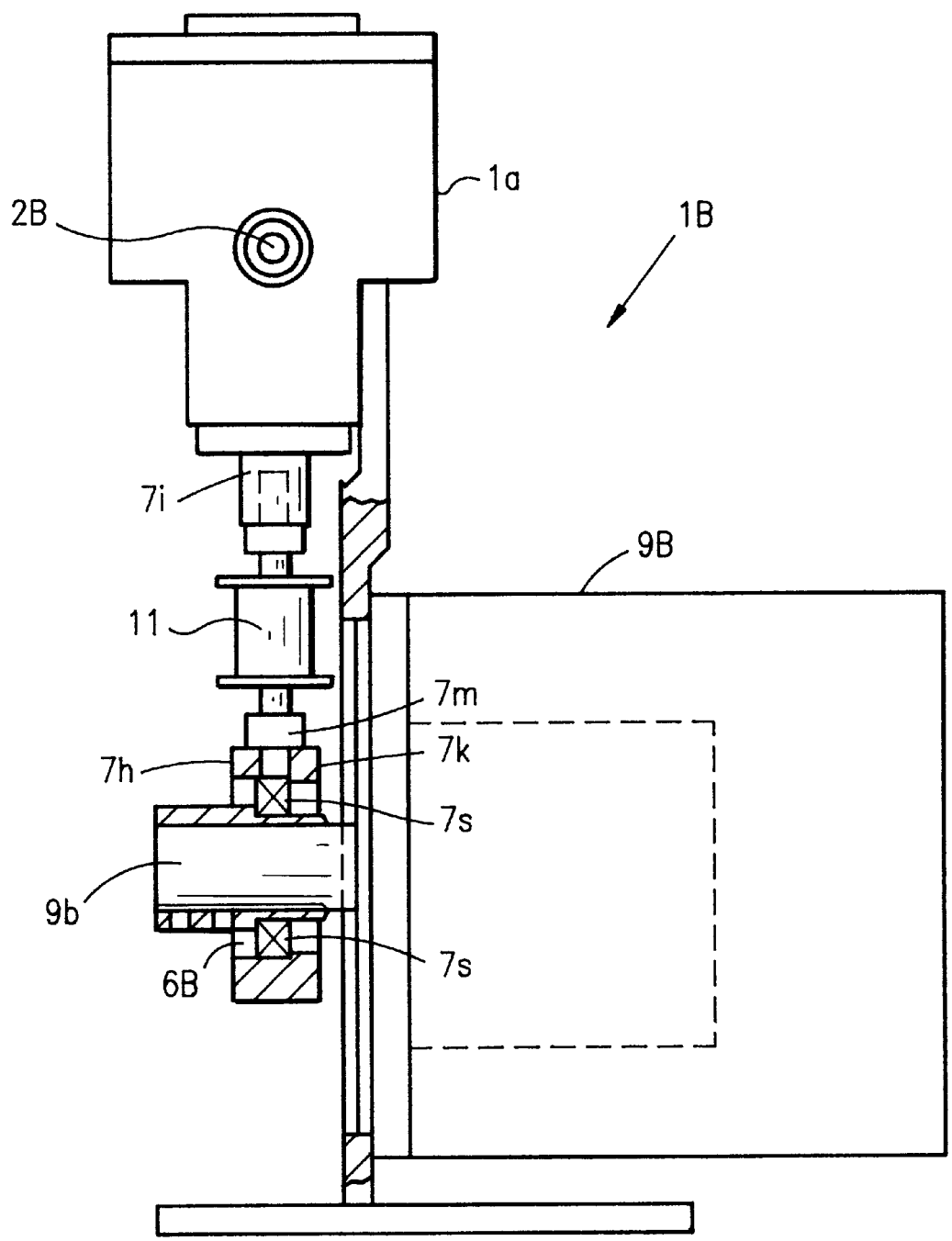
FIG. 12 is a side view, partly in cross section, of the embodiment of FIG. 11.

FIG. 11 is a front view, partly in cross section, of still other embodiment 1B of the pulsating vibration air generation means. FIG. 12 is a side view of the embodiment 1B, partly in cross section.

The pulsating vibration air generation means 1B is provided with a valve seat 4B having a control opening 4a with its narrow opening end facing to an inlet port 2B and is also provided with a valve 7B having a valve head 7i formed like a bowl which is designed to be airtightly inserted into the control opening 4a of the valve seat 4B from upward. A rotating cam 6B is comprised of an eccentric cam fixed to a rotating axle 9b of a driving motor 9B. A ring 7n is outwardly engaged with the eccentric cam via a plural bearings 7s, the ring 7n being attached at the lower part of a rod 7j of the valve 7B by means of a bolt 7k and a nut 7m. Further, the rod 7j of the valve 7B is provided with a vibration absorbing means comprised of a rubber vibration isolator 11 which absorbs vibration generated when the valve 7B moves, whereby negative pulsating vibration air without distortion can be obtained.

According to the pulsating vibration air generation means 1B, the rotating cam 6B comprised of the eccentric cam is driven to be rotated via the rotating axle 9b by driving the motor 9B when air suction by means of an air suction source such as a suction pump is applied on the inlet port 2B. Then the ring 7n moves up and down via the bearings 7s so that the rod 7j of the valve 7B moves vertically and the control opening 4a is opened or closed by means of the valve head 7i and the valve seat 4B. Each time the control opening 4a of the valve seat 4B is opened, air is sucked from the outlet port 3B to the inlet port 2B and the valve 7B repeats open and close operation. As a result negative pulsating vibration air can be continuously and periodically generated.

Figure 13:
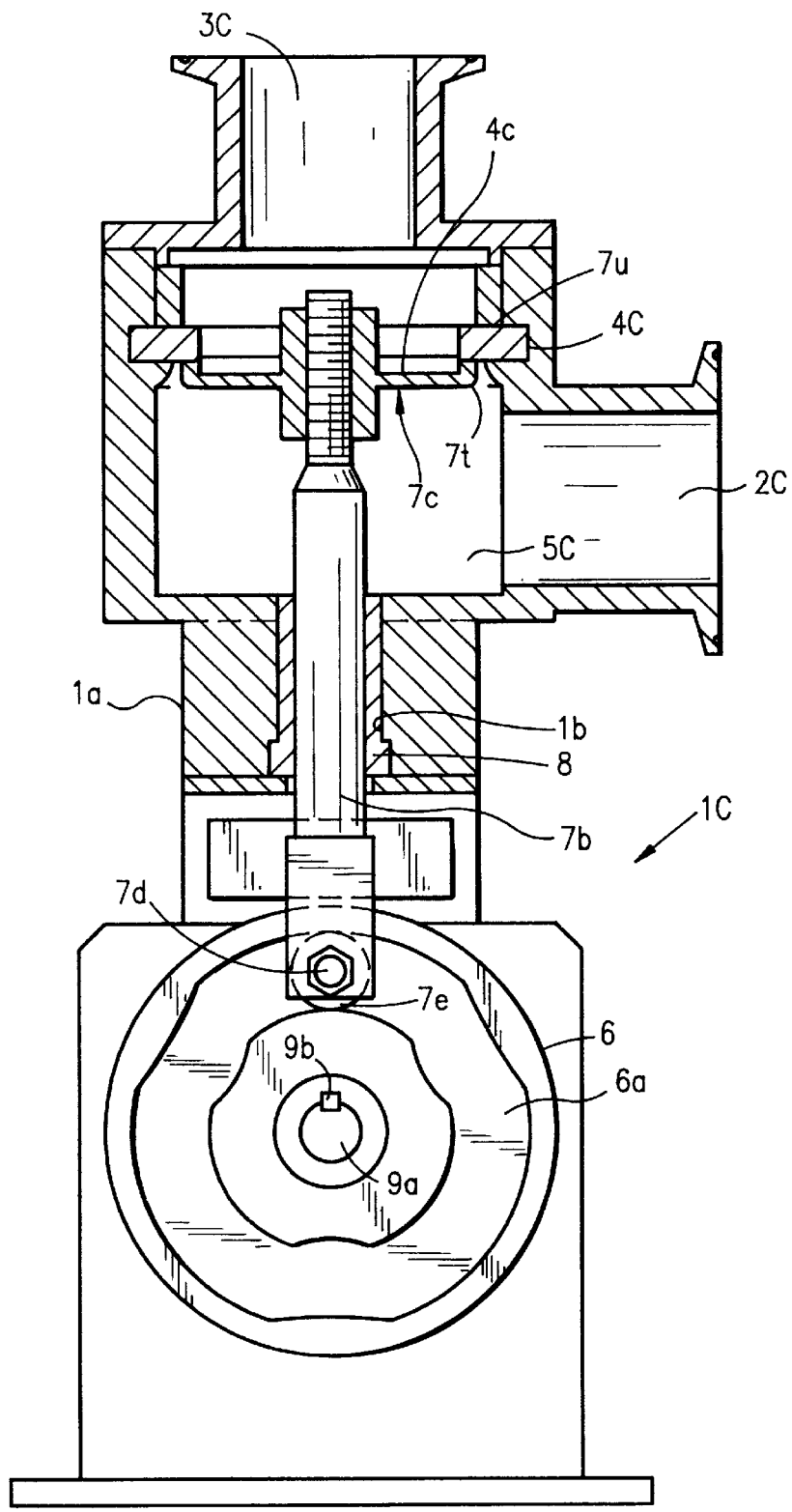
FIG. 13 is a front view, partly in cross section, showing other embodiment of the pulsating vibration air generation means.
Figure 14:
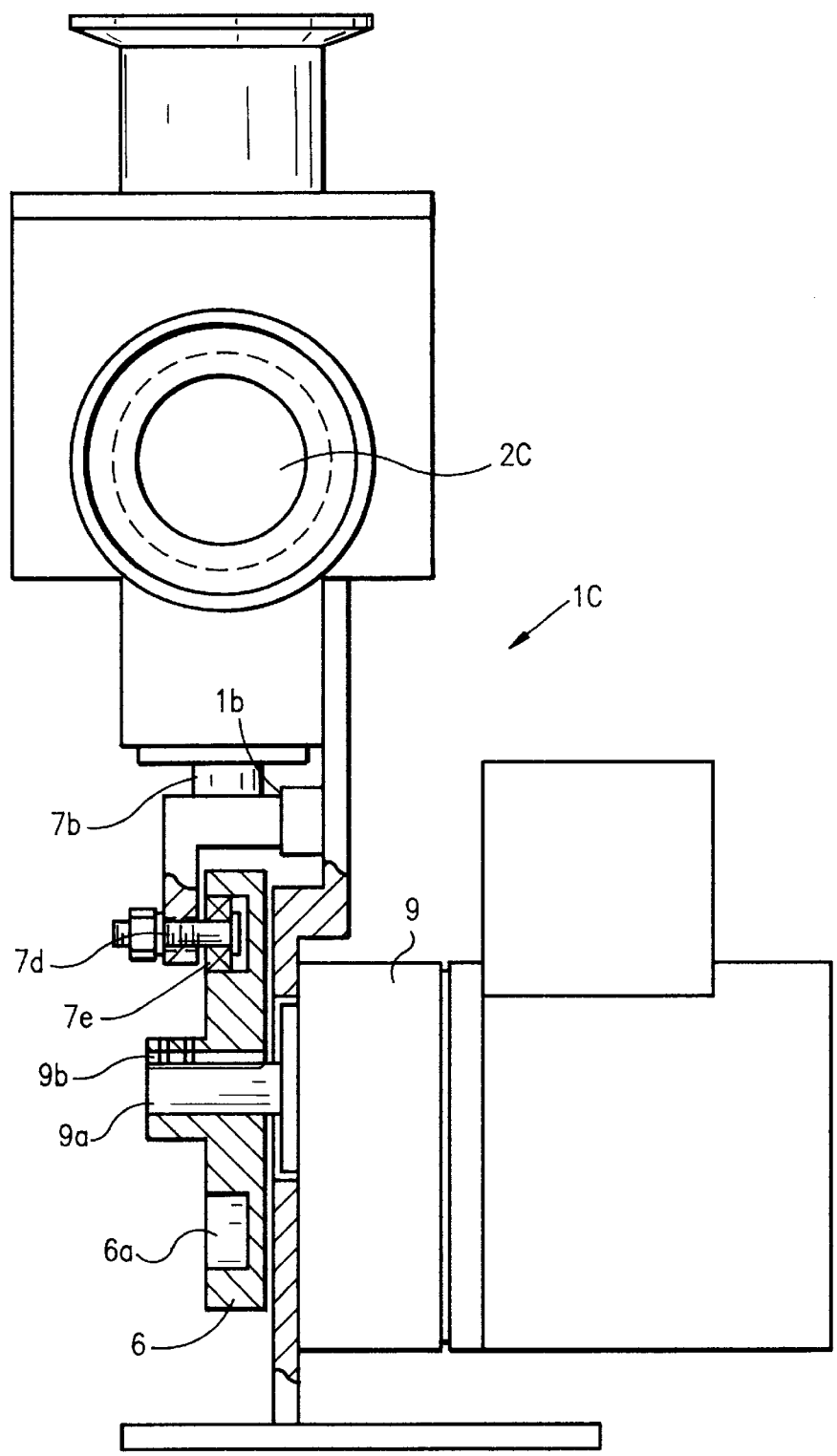
FIG. 14 is a side view, partly in cross section, of the embodiment of FIG. 13.

FIG. 13 shows a front view, in partly cross section, of an embodiment 1C of pulsating vibration air generation means wherein pulsating vibration air is generated by controlling a large amount of air flow. FIG. 14 shows its side view. The construction of a cam 6 and the lower part of a valve 7C are the same as the pulsating vibration air generation means 1, so the same numerals are used and its explanation is omitted.

According to the pulsating vibration air generation means 1C, a valve seat 4C is formed like a flat ring with a center opening 4c as a control opening and the valve 7C is also formed like a flat plate. The circumference of the valve 7C which attaches to the valve seat 4C is projected upward and the numeral 7u shows its upper flat surface.

The caliber of a valve chamber 5 is made large and the calibers of an inlet port 2C and an outlet port 3C communicating to the valve chamber 5C are also made large. The inlet port 2C is connected with a blower (not shown).

According to the pulsating vibration air generation means 1C, the valve 7C is designed such that the flat ring-like surface 7u attaches to the valve seat 4C which is formed as a flat ring. The valve 7C can be closed without causing any space so that air leak caused when pressurized air is supplied or air suction is applied can be prevented, whereby pulsating vibration air with sharp and clear wave shape can be obtained.

It is constructed such that the flat valve seat 4C with a center opening is closed by the valve 7C with the flat surface 7u, a large amount of air flow can be certainly interrupted. Therefore, it is preferable for generating pulsating vibration air by utilizing an air source which supplies a large amount of air such as a blower.

Figure 15:
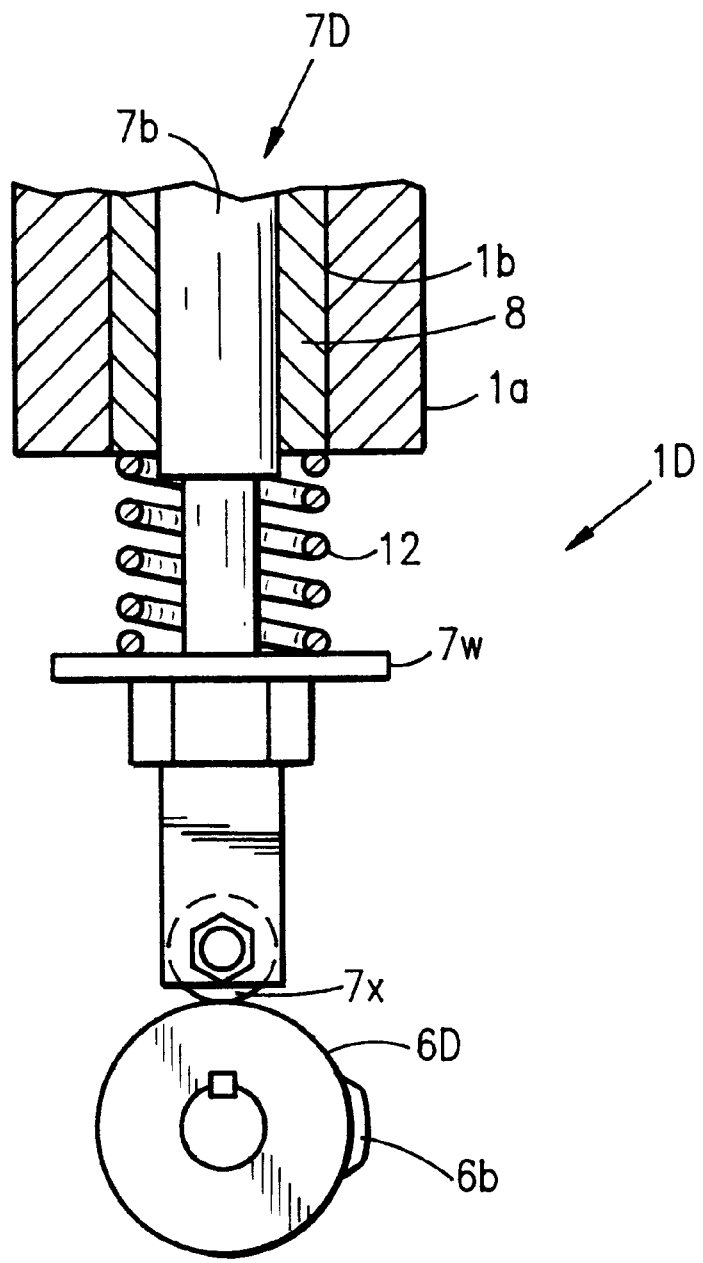
FIG. 15 is a front view, partly in cross section, showing other embodiment of the pulsating vibration air generation means.

FIG. 15 shows still another embodiment 1D of the pulsating vibration air generation means. A convex 6b is provided for an outer surface of a rotating cam 6D. A guide plate 7w is formed at the lower part of a valve 7D and a spring 12 is provided between the guide plate 7w and the lower part of a body 1a of the pulsating vibration generation means 1D so as to press a roller 7x at the lower part of the valve 7D on a cam surface of the rotating cam 6D.

According to such an embodiment 1D, power transmission from the rotating cam 6D to the valve 7D can be accurately executed because the roller 7x is pressed onto the cam surface by means of the spring 12. So, open and close operation of the valve 7D to a valve seat (not shown) can be surely achieved.

Figure 16:
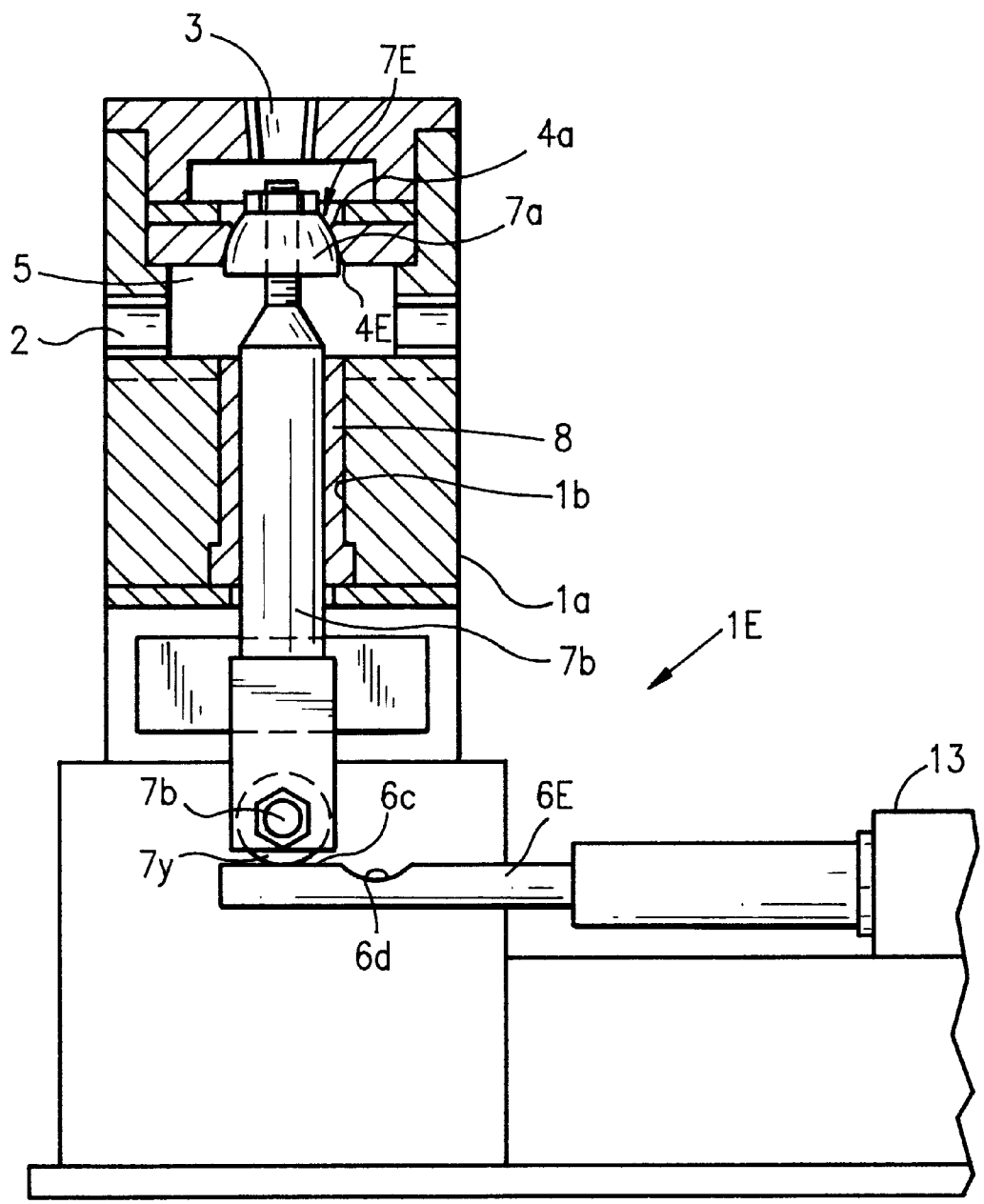
FIG. 16 is a front view, partly in cross section, showing the other embodiment of the pulsating vibration air generation means.
Figure 17:
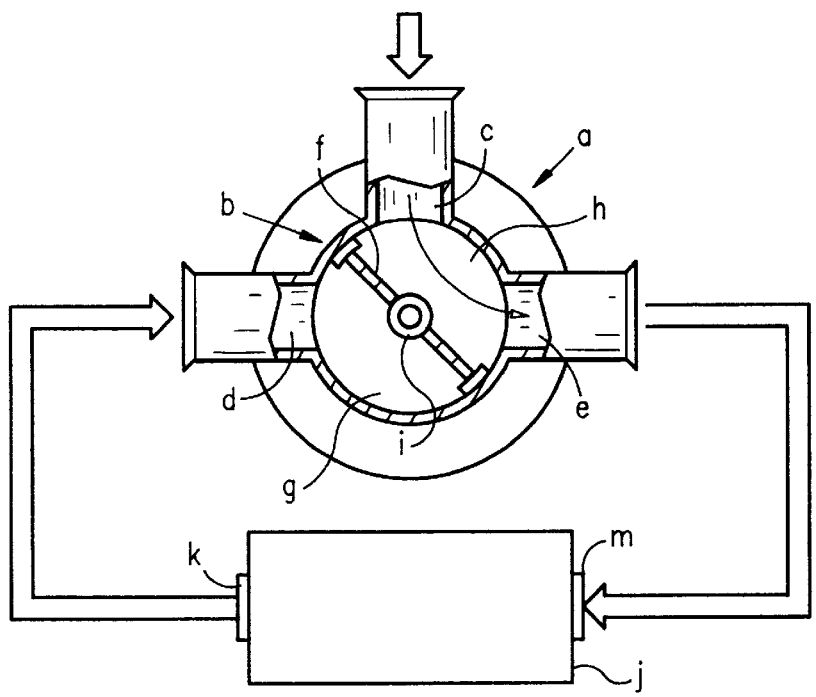
FIG. 17 explains the condition where an outlet port is closed by a valve according to the prior art of the pulsating vibration air generation means.
Figure 18:
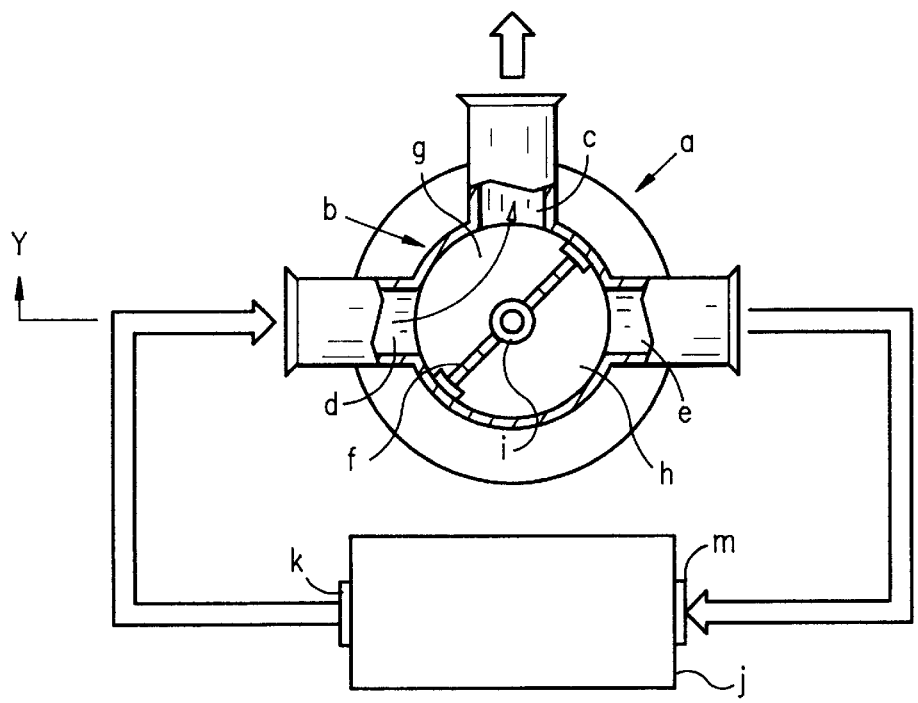
FIG. 18 explains the condition where an outlet port is opened according to the prior art of the pulsating vibration air generation means.

FIG. 16 shows a side view of still another embodiment 1E of the pulsating vibration air generation means.

According to this embodiment 1E, a cam mechanism is provided horizontally and is comprised of a plate-type cam 6E having a concave part 6d on a vertical upper surface 6c. The plate-type cam 6E is constructed so as to be movable back and forth by means of a back and forth movable driving means comprised of a cylinder 13. A roller 7y rotatably attached on the lower end of a valve 7E is provided for the cam surface of the plate-type cam 6E. Other members and construction are the same as those of the pulsating air generation means 1, so the same numerals are shown and the explanation is omitted.

According to such an embodiment 1E, the cam mechanism is comprised of the plate-type cam 6E. The roller 7y provided at the lower end of the valve 7E is attached with the cam surface of the cam 6E so that the valve 7E moves vertically when the cam 6E is moved back and forth by the cylinder 13. And a control opening 4a of the valve 7E is opened or closed by means of a valve head 7a. The open and close operation of the valve 7E can be executed certainly by the back and forth movement of the cam 6E.

A valve may be pressed onto the surface of a plate-type cam by means of a spring if necessary. In such a case the valve can smoothly open and close the control opening of the valve seat and also move smoothly accompanied with the rotation of the cam.

It goes without saying that a cam mechanism with other kinds and other shapes can be applied other than the cam mechanism mentioned above.

It is apparent from the above-mentioned description that following effects can be expected.

According to the present invention, optional positive pulsating vibration air with different wave height, frequency and wave shape can be regularly and periodically generated by varying the shape of the cam mechanism.

Further, optional negative pulsating vibration air with different wave height, frequency and wave shape can be regularly and periodically generated by varying the shape of the cam mechanism.

Still according to the present invention, the control opening of the valve can be opened and closed without leaking air so that clear and sharp pulsating vibration air can be generated. When the valve is closed, the valve head is airtightly inserted into the control opening of the valve seat and uniform pressing force is applied by means of pressurized air. Therefore, sealing effect of the valve is improved and durability of the valve seat can be also improved.

According to the present invention, a large amount of air can be interrupted without leaking air, so that pulsating vibration air with a large air flow can be generated by utilizing a blower as an air source.

Further according to the present invention, the valve is operated by rotating the cam by means of the driving source with stabilized rotation speed. Therefore, optional positive or negative pulsating vibration air with different wave height, frequency and wave shape can be regularly and periodically generated by varying the shape of the cam mechanism. The operation of the valve isn't controlled by a solenoid which executes on-off control by means of electrical signal, so that the valve can repeat up and down movement swiftly. Therefore, pulsating vibration air with high frequency can be generated without distortion.

Further according to the present invention, the valve can be certainly operated by moving the plate-type cam by means of the back and forth movable driving means and the driving means can be installed at the side of the valve. So, it is useful when there is only a small space under the instrument.

According to the present invention, the vibration absorbing means such as a rubber vibration isolator provided for the valve can absorb vibration of the valve. Still according to the present invention, open and close operation of the valve can be surely executed in accordance with the shape of the cam so that pulsating vibration air generation means with high reproductiveness can be provided.

Still according to the present invention, the lower part of the valve is always pressed on the cam surface by means of the elasticity of the spring and the lower part of the valve is prevented from loosing from the cam surface, whereby operation of the valve can be surely executed.

Still further according to the present invention, supply and stop of pressurized air from the inlet port to the outlet port can be controlled by opening and closing the output control valve connected to the flow rate control port. Therefore, output of pulsating vibration air can be stopped without turning off the driving source so that this invention has wide applicability.

What is claimed is:

1. A pulsating vibration air generation means for periodically generating pulsating vibration air, comprising:

an inlet port from which one of: pressurized and suction air is supplied;

an outlet port at which pulsating vibration air is expelled at a fixed frequency;

a valve chamber having a valve seat with a control opening between said inlet port and said outlet port;

a valve plug for opening and closing said control opening of said valve chamber, said valve plug having a head portion adopted to airtightly close said control opening when a valve closing operation is executed; and a valve operating mechanism for periodically moving said valve plug up and down said valve operating mechanism including: a driving source continuously rotating at a fixed speed; a roller rotatable secured to a lower end of said valve plug; and a rotary groove cam for periodically guiding the up and down movement of said valve plug, said rotary groove cam being connected to said drive source and being formed with a ring-like guide groove into which said roller is engaged, whereby said valve plug is regularly and periodically moved up and down for opening and closing operation in accordance with the rotation of said rotary groove cam.

2. A pulsating vibration air generation means as set forth in claim 1, wherein suction air is supplied from said inlet port so that negative pulsating vibration air with a fixed frequency is generated from said outlet port.

3. A pulsating vibration air generation means as set forth in claim 1, wherein said valve seat of said valve chamber is formed similar to a flat ring with a center opening as said control opening.

4. A pulsating vibration air generation means as set forth in claim 1, wherein: said valve seat is further provided with a flow rate control port having a flow control valve; said flow control valve serving to control the output valve of pulsating vibration air at said output port by adjuring the opening degree of said flow control valve.

5. A pulsating vibration air generation means as set forth in claim 1, wherein pressurized air is supplied from said inlet port, wherein said valve seat is formed with a hole similar to a mortar with a reduced tapered opening at the end of the outlet port side of said valve seat, and wherein said head portion of said valve plug is formed similar to a bowl with an enlarged portion corresponding to said reduced tapered opening of said hole at the end of the inlet port side of said valve seat.

6. A pulsating vibration air generation means as set forth in claim 1, wherein suction air is supplied from said inlet portion, wherein said valve seat is formed with a hole similar to a mortar with a reduced tapered opening at the end of the inlet port side of said valve seat, and wherein said head portion of said valve plug is formed similar to a bowl with an enlarged portion corresponding to said reduced tapered opening of the hole at the end of said outlet port side of said valve seat.

7. A pulsating vibration air generation means for periodically generating pulsating vibration air, comprising:

an inlet port from which one of: pressurized and suction air is supplied;

an outlet port at which pulsating vibration air is expelled at a fixed frequency;

a valve chamber having a valve seat with a control opening between said inlet port and said outlet port;

a valve plug for opening and closing said control opening of said valve chamber, said valve plug having a head portion adapted to airtightly close said control opening when a valve closing operation is executed; and a valve operating mechanism for periodically moving said valve plug up and down, said valve operating mechanism including: a drive source continuously reciprocating at a fixed speed; a roller rotatably secured to a lower end of said valve plug; and a plate cam for regularly moving said valve plug up and down, said plate cam being connected to said drive source and being formed with a guiding recess into which said roller is engaged, whereby said valve plug is periodically moved up and down in accordance with the reciprocating movement of said plate cam.

8. A pulsating vibration air generation means as set forth in claim 7, wherein suction air is supplied from said inlet port so that negative pulsating vibration air with a fixed frequency is generated from said outlet port.

9. A pulsating vibration air generation means as set forth in claim 7, wherein: said valve seat is further provided with a flow rate control port having a flow control valve, said flow control valve serving to control the output value of pulsating vibration air at said output port by adjusting the opening degree of said flow control valve.

10. A pulsating vibration air generation means as set forth in claim 7, wherein suction air is supplied from said inlet port, wherein said valve seat is formed with a hole similar to a mortar with a reduced tapered opening at the end of the inlet port side of said valve seat, and wherein said head portion of said valve plug is formed similar to a bowl with an enlarged portion at the end of said outlet port side of said valve seat.

11. A pulsating vibration air generation means as set forth in claim 7, wherein pressurized air is supplied from said inlet port, wherein said valve seat is formed with a hole similar to a mortar with a reduced tapered opening at the end of the outlet port side of said valve seat, and wherein said head portion of said valve plug is formed similar to a bowl with an enlarged portion at the end of said inlet port side of said valve seat.

* * * * *

UNITED STATES PATENT AND TRADEMARK OFFICE
CERTIFICATE OF CORRECTION

PATENT NO. : 6,062,826
DATED : May 16, 2000
INVENTOR(S) : Kiyoshi Morimoto et al It is certified that error appears in the above-indentified patent and that said Letters Patent is hereby corrected as shown below:

Claim 4, line 4, --valve-- (second occurrence) should be --value--.

Signed and Sealed this

Seventeenth Day of April, 2001

Attest:

NICHOLAS P. GODICI

Attesting Officer    Acting Director of the United States Patent and Trademark Office